United States Patent [19]
Morimoto et al.

[11] Patent Number: 5,860,288
[45] Date of Patent: Jan. 19, 1999

[54] ROOF-MOUNTED AIR CONDITIONING ASSEMBLY

[75] Inventors: Mitsuaki Morimoto; Atsuyoshi Yamaguchi, both of Shizuoka, Japan

[73] Assignee: Yazaki Corporation, Tokyo, Japan

[21] Appl. No.: 886,012

[22] Filed: Jun. 30, 1997

[30] Foreign Application Priority Data

Jul. 2, 1996 [JP] Japan .................................. 8-172592

[51] Int. Cl.⁶ .............................. B60H 1/32; F25D 19/00
[52] U.S. Cl. ................................................ 62/244; 62/298
[58] Field of Search ........................... 62/239, 244, 297, 62/298, 259.1, 259.2; 454/137

[56] References Cited

U.S. PATENT DOCUMENTS

| | | | |
|---|---|---|---|
| 2,766,439 | 10/1956 | Palm | 62/244 |
| 2,869,333 | 1/1959 | Hoiby et al. | 62/259.1 |
| 3,611,743 | 10/1971 | Manganaro | 62/297 |
| 4,022,599 | 5/1977 | Wilson et al. | 62/244 |
| 4,426,850 | 1/1984 | Reedy | 62/125 |
| 4,503,749 | 3/1985 | Kuhn et al. | 62/244 |
| 4,727,728 | 3/1988 | Brown | 62/244 |
| 5,116,280 | 5/1992 | Kloster | 454/137 |

Primary Examiner—William Doerrler
Attorney, Agent, or Firm—Armstrong, Westerman, Hattori, McLeland & Naughton

[57] ABSTRACT

On a vehicle roof, there are mounted an air-conditioning unit and a molded ceiling panel having an aperture opened to a duct of the air-conditioning unit, a bezel fitted into the aperture and mounted with one or more of a switch, a lamp, and an instrument. An electrical equipment module has a connector for electrically connecting the switch, the lamp, or the instruments. A roof wiring harness has a preliminarily oriented connector secured thereto. The roof air-conditioning unit has a connector receiving portion provided in the side of the duct. The connector receiving portion can receive the preliminarily oriented connector of the roof wiring harness. The electrical equipment module can be attached to the roof air-conditioning unit through the aperture of the molded ceiling panel so that the connector of the electrical equipment module connects with the preliminarily oriented connector. Thus, the roof wiring harness can be disposed and secured by engaging the preliminarily oriented connector with the connector receiving portion of the roof air-conditioning unit. Further, the electrical equipment module connector and the preliminarily oriented connector can connect to each other by attaching the electrical equipment module to the roof air-conditioning unit. This enables simultaneously mounting of the electrical equipment module and electrical connection thereof.

6 Claims, 15 Drawing Sheets

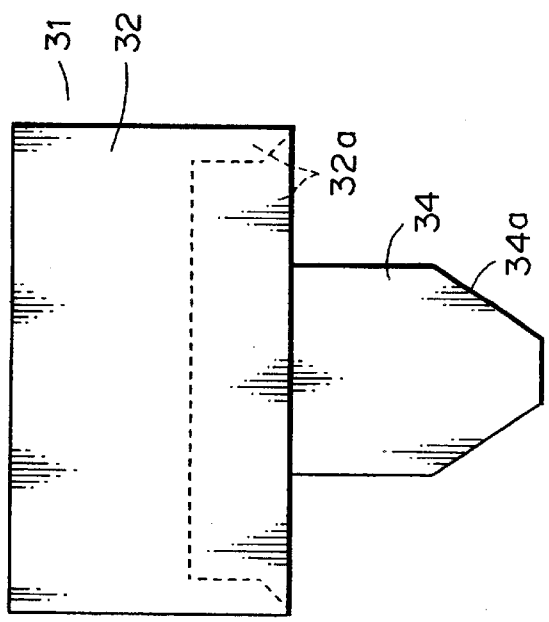
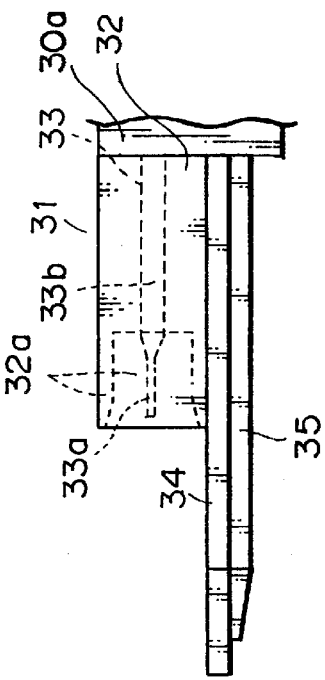
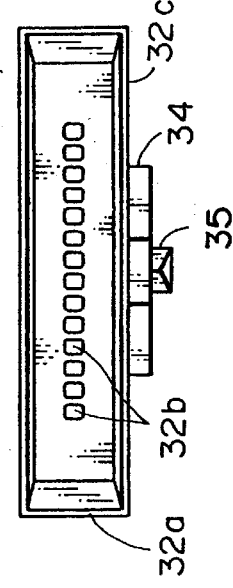

ROOF-MOUNTED AIR CONDITIONING ASSEMBLY

FIELD OF THE INVENTION

This invention relates to a roof-mounted air conditioning assembly, suitably for larger-sized cars, and in which application of a roof air-conditioning unit, secured on a vehicle roof, improve integrated arrangement of various functional parts mounted on the roof allow simplification of roof wiring harnesses, and providing better work environment in the assembling.

BACKGROUND OF THE INVENTION

In mounting work of electrical equipment, such as a room lamp around a roof in a car interior and an electrical wiring work, there has been the drawback that workers can not continue to work in an appropriately long period of time because the workers must be continuously glancing upward in the narrow interior space. Such work is fatiguing.

Therefore, for simplifying work to reduce fatigue of the workers and to improve productivity, the assignee as this application has proposed a roof module shown in FIG. 14 and disclosed in Japanese Patent Application no. 7-333184.

Such roof module consists of a molded base plate 1 covering an interior, a forward roof portion made of a synthetic resin and a molded ceiling panel 17 covering the roof. The module has a construction for installing various electrical equipment and interior implements on the roof.

More specifically, on the base plate 1 there are a GPS (global positioning system) receiving antenna 1, a control unit 3, and a modular circuit board 4 for connecting the control unit 3, the electrical equipment, etc. The control unit 3 has a unit base plate 3a mounted with a keyless entry receiver portion 5, a lamp 6, a switch assembly 7, and a multi-layer control board 8 for controlling the lamp 6 and a room mirror 10. The control unit 3 is mounted on a central operation aperture 1a of the base plate 1. A case 3b and a lamp cover 9 cover the control unit 3, respectively, from the upper and lower sides. Then, the unit 3 united with the coverings is secured on the base plate 1 with screws or the like. Each of the electrical equipment is operated by using the switch assembly 7 of the control unit 3. The base plate 1 has a connector 13 connecting to the modular circuit board 4 and positioned at one end thereof. The connector 13 also connects to a wiring harness 15 disposed in a front pillar 14 of the vehicle body.

Meanwhile, the molded ceiling panel 17 has a module mounting shallow recess 17a at a forward end portion thereof. In the shallow recess 17a is laid the molded base plate 1 to be secured thereto. On a lower surface of the shallow recess 17a there are fitted with some interior equipment, that is, an electrically driven room mirror 10 and a sun visor 11 having a vanity lamp (not shown) respectively with fixtures 10a, 11a. The modular circuit board 4 connects to connectors (not shown) disposed so as to oppose to the fixtures 10a, 11a, so that installation of the room mirror 10 and the sun visor 11 allows simultaneously circuit connection for a related driving motor and the vanity lamp.

Further, in each side end portion of the molded ceiling panel 17 there is disposed a subwire assembly 19 connecting to a rear room lamp 18. The sub-wire assembly 19 has an end connector 20 disposed on the shallow recess 17a. The connector 20 engages with a connector 12 connected to the modular circuit board 4, allowing the circuit of the molded base plate 1 to be connected to the sub-wire assembly 19.

The roof module in FIG. 14 includes integrated functional equipment such as the antenna 2, the lamp 6, the switch assembly 7, and the room mirror 10 on the molded base plate 1, the equipment being appropriately electrically connected. The molded ceiling panel 17 has a subwire assembly 19 disposed thereon, and the molded ceiling panel 17 having been combined with the molded base plate 1 is furnished in the vehicle body. Thereby, electrical connection is the rear room lamp 18 or the like is completed. This needs no fixtures for fitting the functional equipment, greatly reducing the numbers of parts and eliminating such a work as drawing out connectors from holes of the molded ceiling panel to make electrical connection to each functional equipment. This provides advantages such as a greatly improved connection process.

However, in a relatively larger-sized car, as a vehicle used for leisure (so called RV vehicle), such car has a larger-sized roof, and over the roof there are spread out larger-sized electrical equipment (or auxiliary instruments) such as an air-conditioning unit, a television, a room lamp, and a sun roof. Thus, it is difficult to integrate the functional equipment disposed in the roof at one forward position as shown in FIG. 13.

Moreover, the many electrical equipment, including the air-conditioning unit, cause a complicated arrangement of the roof wiring harness, which requires a considerable amount of hand work and man hour in its electrical wiring. FIG. 15A shows an example of such arrangement of a roof wiring harness W applied in a larger-sized car. The wiring harness W requires many branch lines W1, W2, ..., W5 for connection of a map lamp L1, each side spot lamp L2, L3, a sun roof M, and a rear room lamp L4. Furthermore, the harness W must include branch lines W1', W2' from a cowl side wiring harness for an air-conditioning unit N and a television O.

Thus, in the roof of the larger-sized car, many wiring harnesses and their connectors require arrangement and connection work thereof. This causes a fatiguing, heavy, long hour work in the narrow vehicle interior.

SUMMARY OF THE INVENTION

In view of the above mentioned drawback, an object of this invention is to provide a roof air conditioning assembly, which utilizes particularly a roof air-conditioning unit secured on a roof of a larger-sized vehicle body to allow integrated arrangement of various functional equipment disposed on the roof and to achieve a simplified roof wiring harness, resulted in better workability thereof.

For achieving the object, in a first basic configuration of the invention, a roof air conditioning assembly includes:

a roof air-conditioning unit installed on a vehicle roof, a molded ceiling panel having an aperture opened to a duct of the air-conditioning unit, a bezel fitted into the aperture and mounted with a switch, a lamp, or an instrument, an electrical equipment module having a connector for electrically connecting the switch, the lamp, or the instrument, and a roof wiring harness having a preliminarily oriented connector secured thereto, wherein the roof air-conditioning unit has a connector receiving portion provided in the side of the duct; the connector receiving portion can receive the preliminarily oriented connector of the roof wiring harness; and the electrical equipment module can be installed to the roof air-conditioning unit through the aperture of the molded ceiling panel so that the connector of the electrical equipment module connects with the preliminarily oriented connector.

In the first configuration, the roof wiring harness can be disposed and secured by engaging the preliminarily oriented connector with the connector receiving portion of the roof air-conditioning unit. Further, the electrical equipment module connector and the preliminarily oriented connector can connect to each other by attaching the electrical equipment module to the roof air-conditioning unit. This enables simultaneously the furnishing of the electrical equipment module and the related electrical connection, greatly improving the fitting process in workability.

In a second configuration of the invention, the roof air-conditioning unit has a unit case a peripheral wall of which is fitted with a plurality of wire hooks for holding the roof wiring harness. This allows a precise, simple, sure furnishing work of the roof wiring harness without using other fixtures.

In a third configuration of the invention, the preliminarily oriented connector has a connector case provided with a module receiving portion; and the connector of the electrical equipment module has a guide member that engages with the module receiving portion, allowing the electrical equipment module to be assembled in the roof air-conditioning unit. This allows the electrical equipment module to be easily fitted to the roof air-conditioning unit.

In a fourth configuration of the invention, the bezel has a connector for electrical connection of the switch, the lamp, or the instrument, and has unitedly a control unit for the switch, the lamp, or the instrument. And, in a fifth configuration of the invention, a controls unit for controlling the switch, the lamp, or the instrument is provided in the roof air-conditioning unit. Besides, the control unit can be arranged selectively in the bezel or the roof air-conditioning unit.

In a sixth basic configuration of the invention, a roof-mounted air conditioning assembly includes:

a roof air-conditioning unit installed on a vehicle roof, a molded ceiling panel having an aperture opened to a duct of the air-conditioning unit, a bezel fitted into the aperture and mounted with a switch, a lamp, or an instrument, a control unit for controlling the switch, the lamp, or the instrument, a roof wiring harness having a connector, wherein the roof air-conditioning unit has a control unit mounting portion provided in the side of the duct; an integrated connector for connecting the control unit and an electrical equipment provided in the roof air-conditioning unit such as a blower motor; the control unit can be attached to the control unit mounting portion; and the integrated connector can connect to the connector of the roof wiring harness, allowing the roof wiring harness, the control unit, and the roof air-conditioning unit to make electrical connection with each other.

In the sixth configuration, the control unit mounting portion is provided in the roof air-conditioning unit structure, and the mounting portion can easily receive the control unit. This achieves a compact arrangement as a whole. Further, the roof air-conditioning unit has an integrated connector for connecting the control unit and an electrical equipment provided in the roof air-conditioning unit such as a blower motor; the integrated connector can connect to the connector of the roof wiring harness. Thereby, the roof wiring harness, the control unit, and the roof air-conditioning unit make electrical connection with each other, greatly improving the furnishing process in workability.

BRIEF DESCRIPTION OF THE DRAWINGS

FIG. 5A is the front view of a female connector 31 for integrated connection of an electrical equipment module A in FIG. 1, and FIGS. 5B, 5C are respectively a side view or a plan view of the same;

DETAILED DESCRIPTION OF THE PREFERRED EMBODIMENTS

Preferred embodiments of the invention will be discussed hereinafter.

Figure 1:
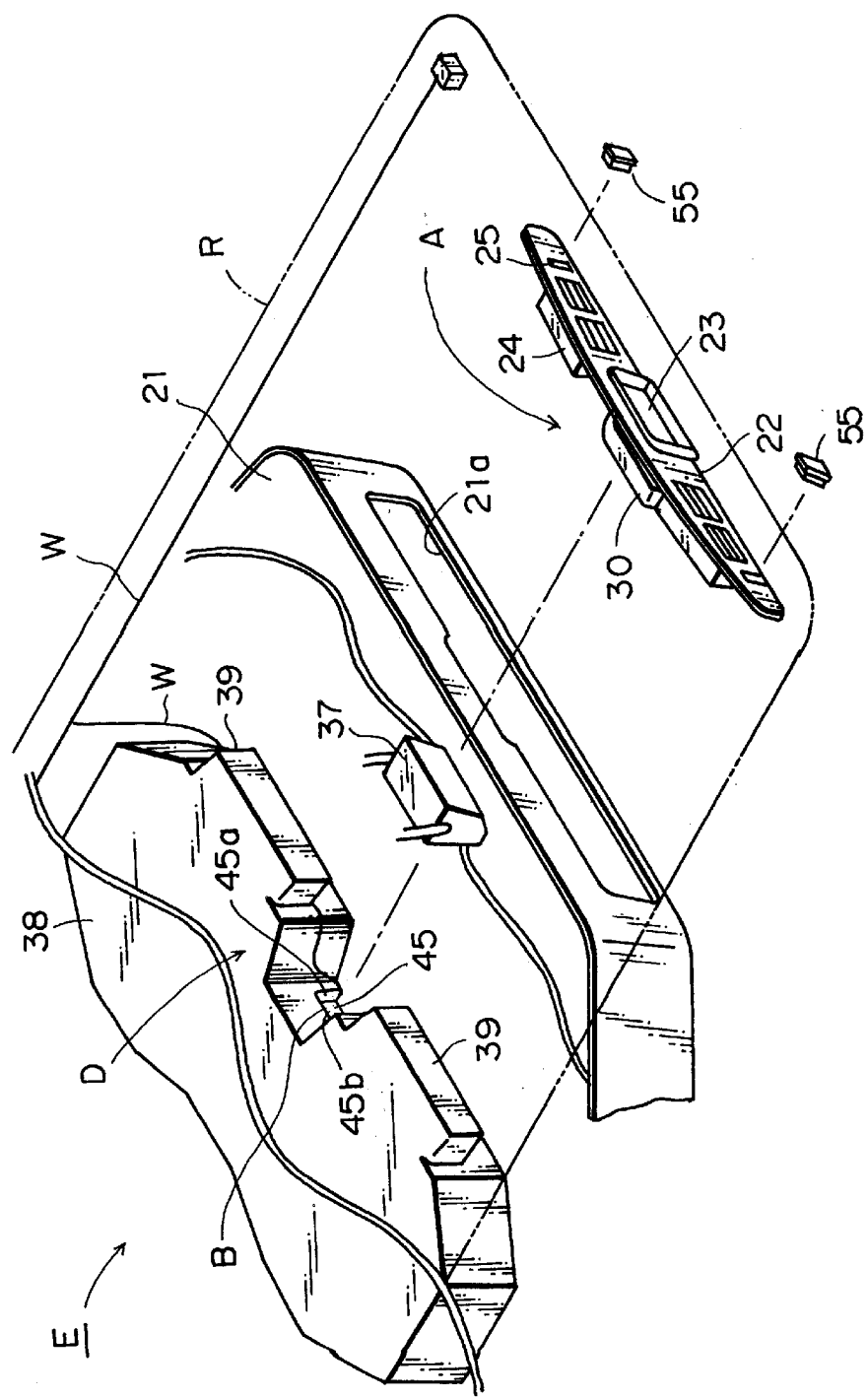
FIG. 1 is a perspective view of a separated roof air conditioning assembly according to the present invention.
Figure 2:
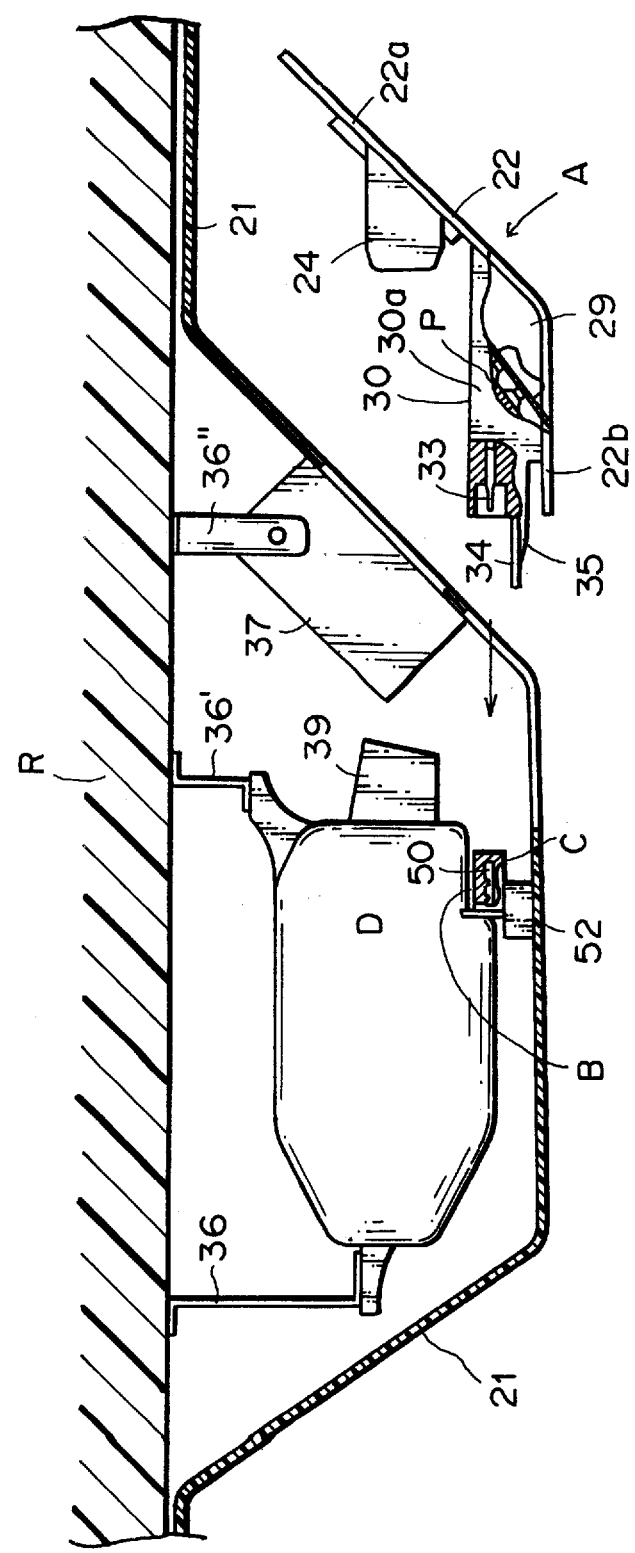
FIG. 2 is a partially assembled sectional view of the assembly in FIG. 1.

FIG. 1 is a perspective view of a roof air conditioning assembly according to the present invention, and FIG. 2 is a partially completed sectional view of the assembly in FIG. 1.

In these Figures, designated E is a roof air conditioning assembly, which consists of an electrical equipment module A, a roof air-conditioning unit D disposed in a molded ceiling panel 21 mounted on a vehicle roof R, a connector receiving portion B formed in the unit D, a preliminarily oriented connector C connected to a roof wiring harness W in the vehicle body side, etc.

Figure 3:
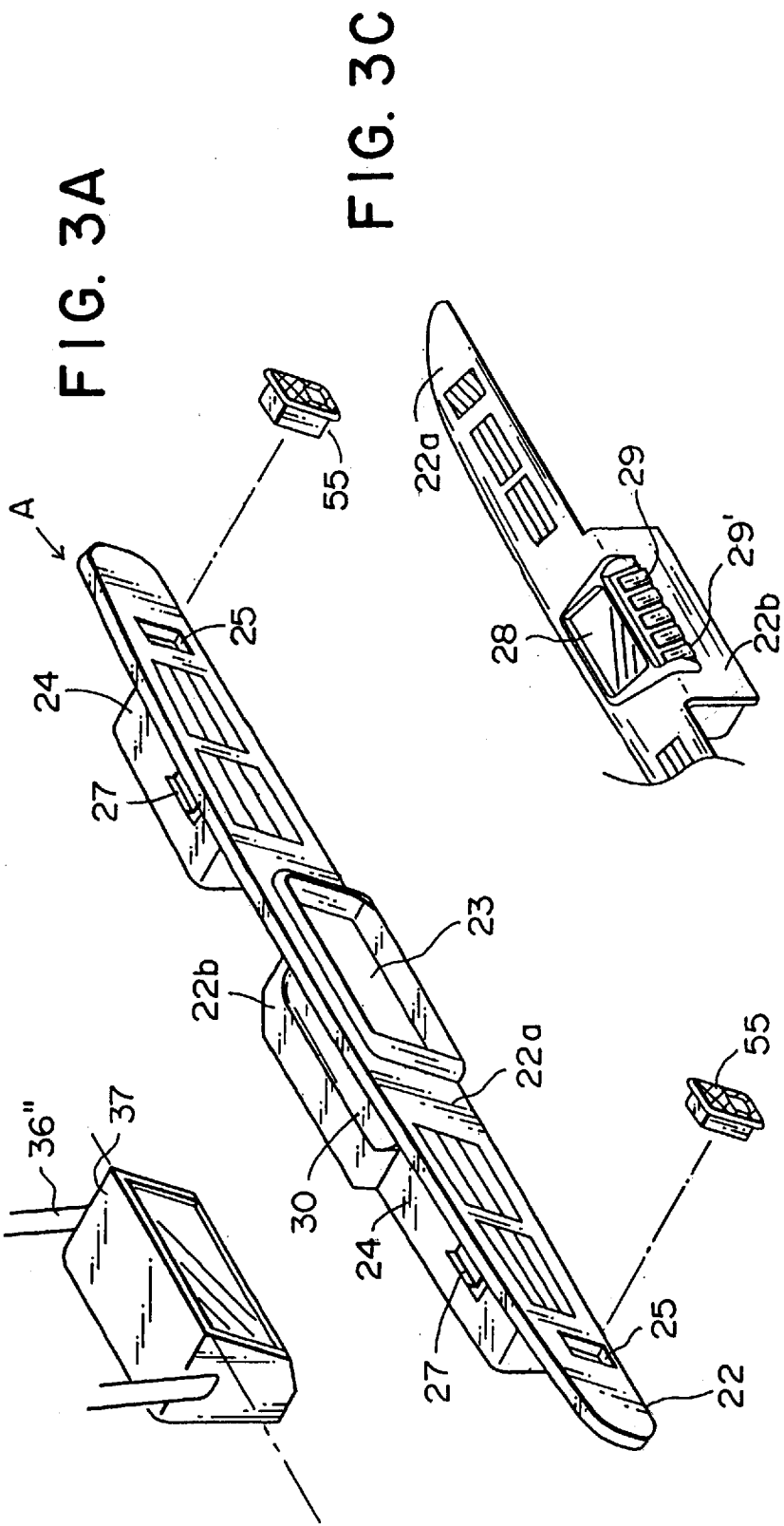
FIGS. 3A, 3B and 3C are an enlarged perspective exploded view of a bezel 22 shown in FIG. 1.
Figure 4:
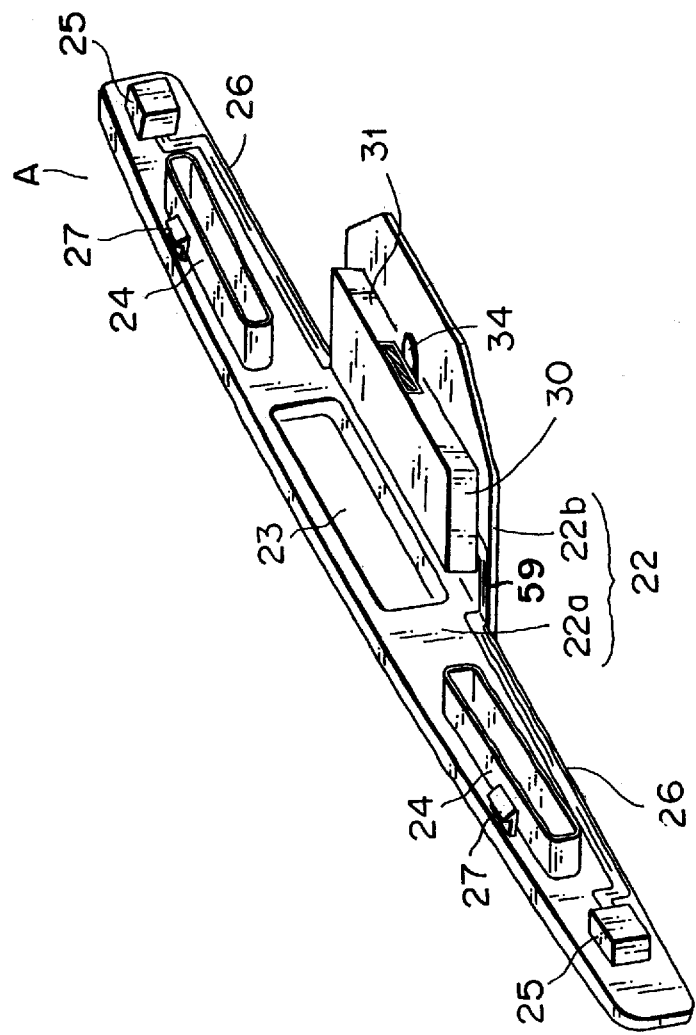
FIG. 4 is a perspective rear view of the bezel 22 in FIGS. 3A, 3B and 3C.

The electrical equipment module A, as shown in FIGS. 3 and 4, is an operation board made of a synthetic resin and having a bezel 22, in a rear surface of which a control unit 30 being mounted. The control unit 30 has a female connector 31 connected to the preliminarily oriented connected C, FIG. 2.

That is, the bezel 22, FIG. 4, consists of a bezel main panel 22a and a horizontal supporting plate 22b rearward extending from its lower end. The control unit 30 is positioned between the bezel main panel 22a and the supporting plate 22b.

The bezel main panel 22a has a front center aperture 23, FIGS. 3A, 3B, 3C, for a television 37, FIG. 3B, a duct cover 24, FIG. 3A, unitedly formed at each side of the aperture, and limp fitting apertures 25 formed at each side end portion of the panel and mounted with a spot lamp 55 that will be described later. On a rear surface of the bezel main panel 22a there is disposed a FPC (flexible print circuit) 26, FIG. 4, connected to the control unit 30 and which leads to the lamp fitting aperture 25. Adjacent to an upper edge of the bezel main panel 22a is formed with each side, lock projection 27, FIGS. 3 and 4, which engage with a hole 21a, FIG. 1, formed in the molded ceiling panel 21 to lock bezel 22 and ceiling panel 21 together.

Meanwhile, the supporting plate 22b, FIGS. 2, 3C, of the bezel 22 has, for the rear seats, an information display 28 giving a road map, route information, weather conditions, tour information, public facility information, etc. Further, the plate 22b is mounted with several switches such as an air conditioning switch 29, FIG. 3C, and a sun roof switch 29'.

The control unit 30, FIGS. 2, 3A and 4, has a printed wiring board 59, FIG. 4, in a unit case 30a. The board 59 includes a micro computer for controlling the several types of switches, the air-conditioning unit, the sun roof, the interior illumination, etc. The unit case 30a, FIGS. 2 and 5A, is fitted with a female connector 31 unitedly in its rear wall.

The female connector 31, as shown in FIGS. 5A, 5B and 5C, has a hood 32a for the preliminarily oriented connector C at the front side of the connector case 32. In the case 32 are formed, in parallel, a plurality of terminal receiving chambers 32b, FIG. 5A. Designated 33, FIG. 5B, is a male terminal having a fore end tab 33a positioned within the hood 32a, and a rear, lead connecting fitting 33b in the terminal receiving chamber 32b. The fitting 33b has been permanently connected by soldering to a circuit conductor (now shown) of the printed wiring board 59 by way of a lead wire 58, FIG. 12.

Furthermore, a guide projection plate 34, FIG. 5C, is provided so as to extend from the bottom wall 32c of the connector case 32. The guide plate 34 has a forwardly tapered portion 34a at each side end thereof. On an under central surface of the guide plate 34 is fitted with a positioning projection 35 having a forwardly tapered tip.

Referring to FIGS. 1 and 2, the roof air-conditioning unit D is fixed on a bottom surface of the vehicle roof R by way of fore and aft brackets 36, 36', FIG. 2. Further, a television 37, for the rear seats of the vehicle is hung down by a bracket 36" ahead of and apart from the unit D.

Figure 7:
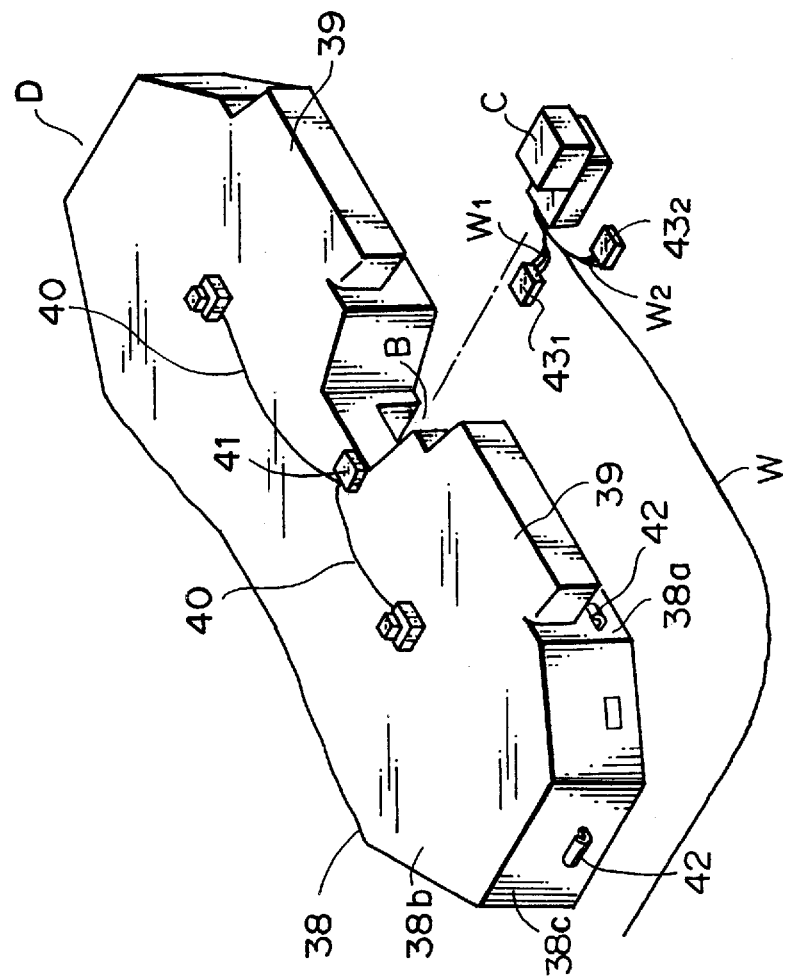
FIG. 7 is a perspective view of a roof air-conditioning unit D and a roof wiring harness W shown in FIG. 1.
Figure 8A:
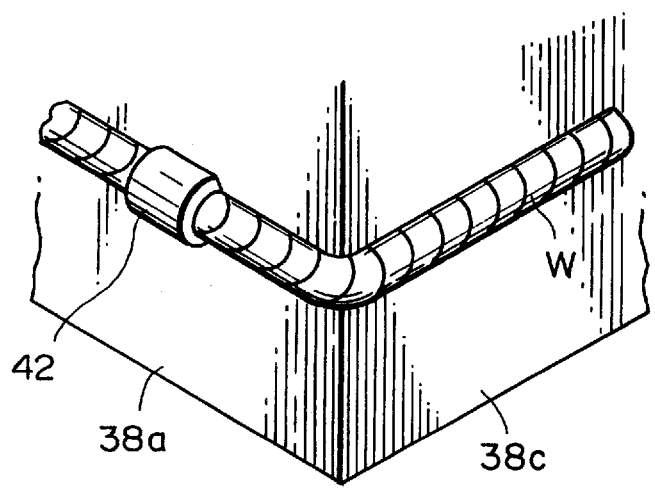
FIG. 8A is a perspective view of a major structure for fitting the roof wiring harness W to the roof air-conditioning unit D shown in FIG. 7.
Figure 8B:
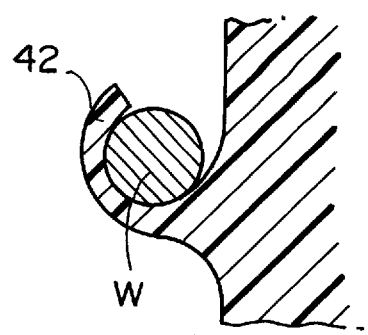
FIG. 8B is a partial sectional view of the same.

The roof air-conditioning unit D, as shown in FIGS. 7, 8A, and 8B, includes a unit case 38 having a reduced width in the middle and larger side portions around the middle, like a dumbbell. The case 38 has a duct 39 at each side of a front wall 38a thereof. In each side portion of the case 38, there are mounted electrical equipment, such as a blower motor and a blower fan, and auxiliary instruments such as an evaporator (there are not shown). Further, there is provided an integrated connector 41 connected to electrical wirings 40, 40 for the electrical equipment on the middle portion of a top wall 38b of the case 38. Furthermore, a plurality of wire hooks 42 are unitedly extended from each side wall 38c and from the front wall 38a of the unit case 38. These wire hooks 42 can secure the roof wiring harness W disposed along the peripheral walls of the unit case 38 as shown in FIGS. 8A, 8B.

End terminals of the roof wiring harness W are connected to the preliminarily oriented connector C, FIG. 7. Further, two branch lines W1, W2 from the preliminarily oriented connector C have respectively connectors $43_1$, $43_2$ at each leading end thereof. The connector $43_1$ is connected with integrated connector 41, and the other connector $43_2$ to a connector (not shown) for the television 37.

The connector receiving portion B, FIG. 1, for positioning and securing the preliminarily oriented connector C, FIG. 2, is a recess formed in a bottom face of the central, narrow-width portion of the unit case 38, FIG. 1. The recess has an inner front wall 45, each side walls 45a, and a top wall 45b. A flange positioning groove 46 is formed continuously in the side wall 45a and the top wall 45b. The inner front wall 45 has a wire leading groove 47 open at a lower end thereof.

Figure 6B:
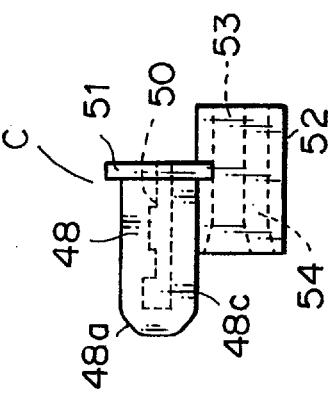
FIG. 6A is the front view of a preliminarily oriented connector C shown in FIG. 1, and FIGS. 6B, 6C are respectively a side view or a plan view of the same.
Figure 6C:
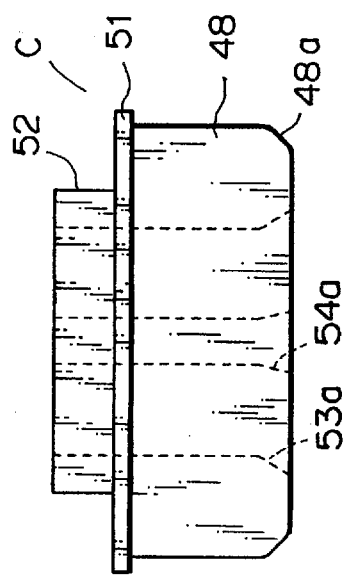
Figure 6A:
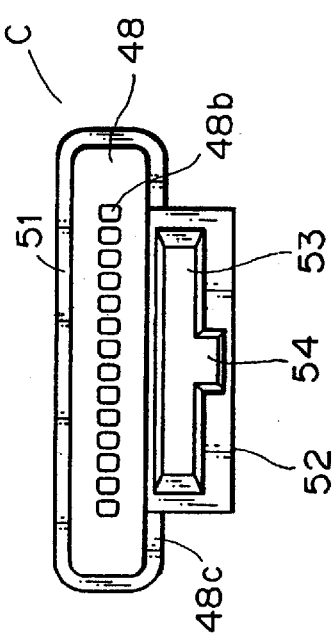

The preliminarily oriented connector C is a male connector corresponding to the female connector 31. The connector C, as shown in FIGS. 6A to 6C, has a tapered guiding portion 48a formed in a fore end of its connector case 48 for engaging with the female connector 31. A plurality of parallel terminal receiving chambers 48b formed in the connector case 48 receive and secure respectively a female terminal 50 (shown in FIGS. 11 and 12) connected to a wire 49 of the roof wiring harness W.

Further, the connector case 48, FIG. 6C, has a flange 51 formed at a rear end periphery thereof and has a module receiving portion 52 unitedly formed on a bottom wall 48c thereof, FIG. 6A. The module receiving portion 52 is extending from the rear half of the bottom wall 48c to project from the rear end of the connector case 48. The module receiving portion 52 has an engagement hole 53 corresponding to the guide projection 34 of the female connector 31, and has an engagement hole 54 corresponding to the positioning projection 35 and adjacent to the hole 53. The engagement hole 53 and the engagement hole 54 has respectively an entrance with a forwardly divergent, tapered portion 53a or 54a.

Figure 9:
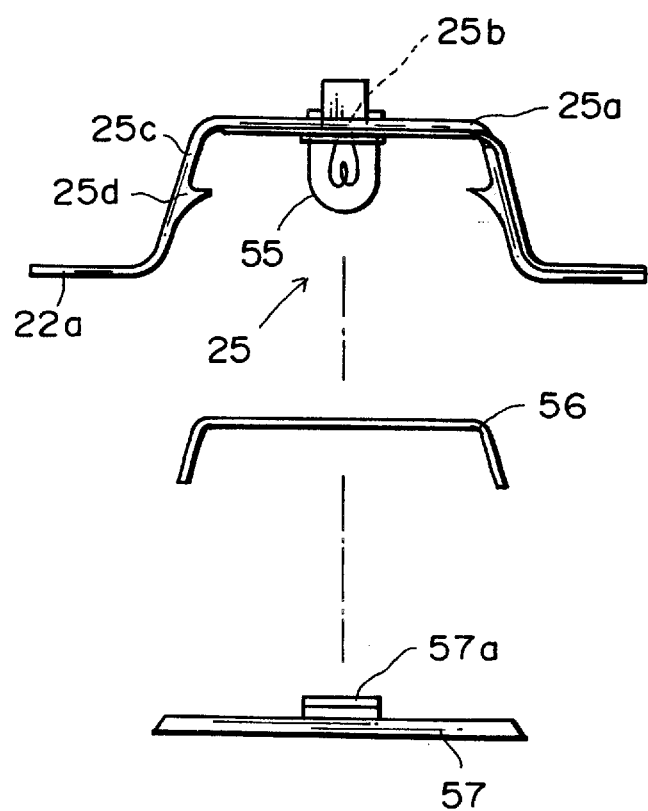
FIG. 9 is a diagrammatic view of a structure for securing a spot lamp 55 shown in FIG. 3.

FIG. 9 shows a structure for fitting the spot lamp 55 to the bezel 22. The lamp receiving aperture 25 has a lamp inserting hole 25b formed in the bottom wall 25a of the bezel main panel 22a. A truncated conical peripheral wall 25c in the structure has a lock projection 25d. The spot lamp 55 is inserted from the front side of the bezel main panel 22a to be secured in the lamp inserting hole 25b. Then, a reflector 56 is attached and is locked by a lock projection 25d. Further, a plastic lens 57 is covered on the lamp, and a lock projection 57a of the lens engages with a locking groove (not shown) formed in the peripheral wall 25c to be secured thereto.

Figure 10A:
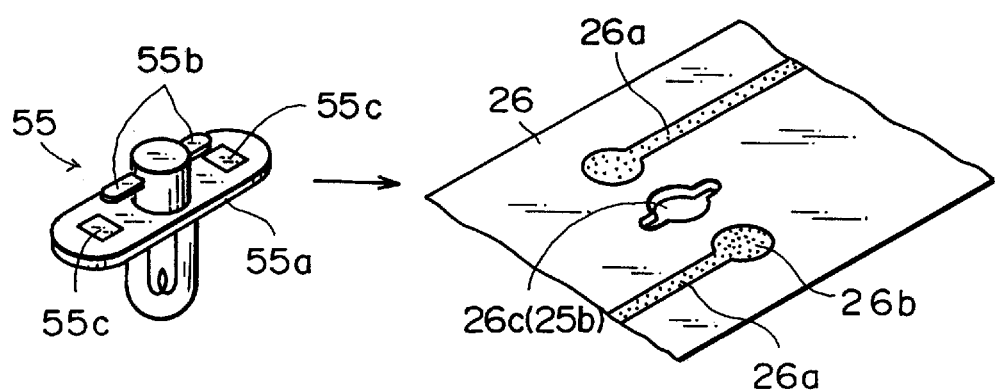
FIG. 10A is a perspective view of the spot lamp 55 and its relative FPC (flexible print circuit) 26.
Figure 10B:
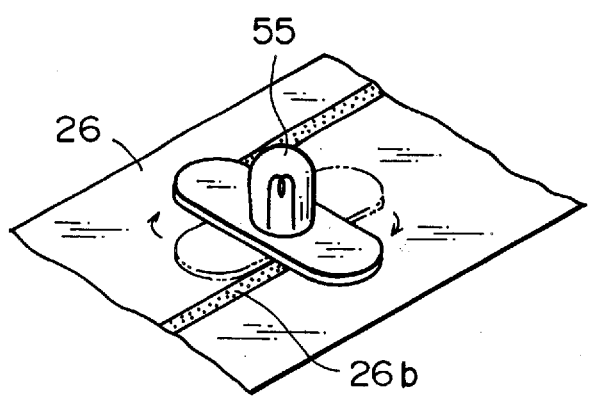
FIG. 10B is a perspective view showing a connected state of the same.

FIGS. 10A and 10B shows a construction for securing and electrically connecting the spot lamp 55. As shown in FIG. 10A, the spot lamp 55 has a fitting plate 55a laterally extending from each side thereof and positioned in an intermediate portion of the lamp. The lamp also has a pair of laterally extending lock pins 55b near the rear end of the lamp. The fitting plate 55a has a pair of terminals 55c on its rear surface.

Meanwhile, on the bottom wall 25a of the lamp fitting aperture 25 there is disposed and secured the FPC 26 connecting to the control unit 30. Between a pair of circuit conductors 26a with each land 26b is formed an insertion hole 26c coaxial with the lamp inserting hole 25b.

As shown in FIG. 10B, the spot lamp 55 is inserted from the front side of the bezel 22 into the lamp inserting hole 25b with the lock pins 55b being correctly aligned. Then, turning the lamp by 90° as shown by arrow heads to be locked threat can contact the terminal 55c with the lands 26b for electrical connection. Thus, the spot lamp 55 can be easily mounted from the front side of the bezel 22.

Next, a mounting and fitting method of the roof air conditioning assembly E, FIG. 1, will be discussed. This includes arrangement of the roof wiring harness W and installation of the electrical equipment module A into the roof air-conditioning unit D where the connector receiving portion B receives the preliminarily oriented connector C.

At first, as shown in FIG. 2, the roof air-conditioning unit D is secured on the vehicle roof R by way of the brackets 36, 36'. Then, the roof wiring harness W, as shown in FIGS. 7 and 8, is disposed by using the wire hooks 42 formed on the unit case 38. The terminal connector $43_1$ of the branch line W1 is engaged to connect to the integrated connector 41 of the air-conditioning unit. In the connector receiving portion B of the unit case 38, the flange 51 of the preliminarily oriented connector C is forced upwardly into the flange positioning groove 46, FIG. 11. Then, screws (not shown) fix the preliminarily oriented connector C, FIG. 7, to the unit case 38.

Figure 13:
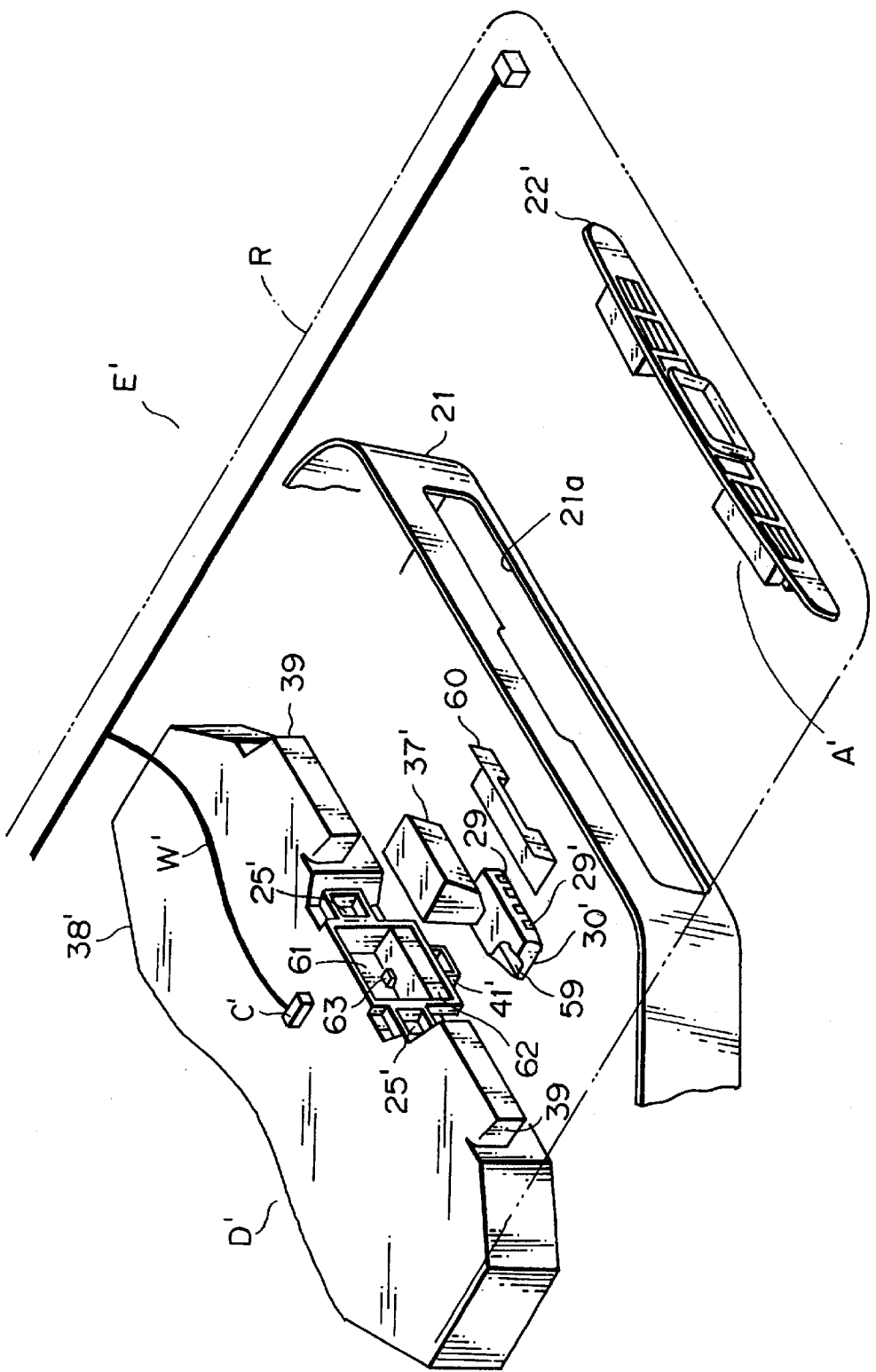
FIG. 13 is a separated perspective view of another embodiment of a roof-mounted air conditioning assembly according to the invention.
Figure 14:
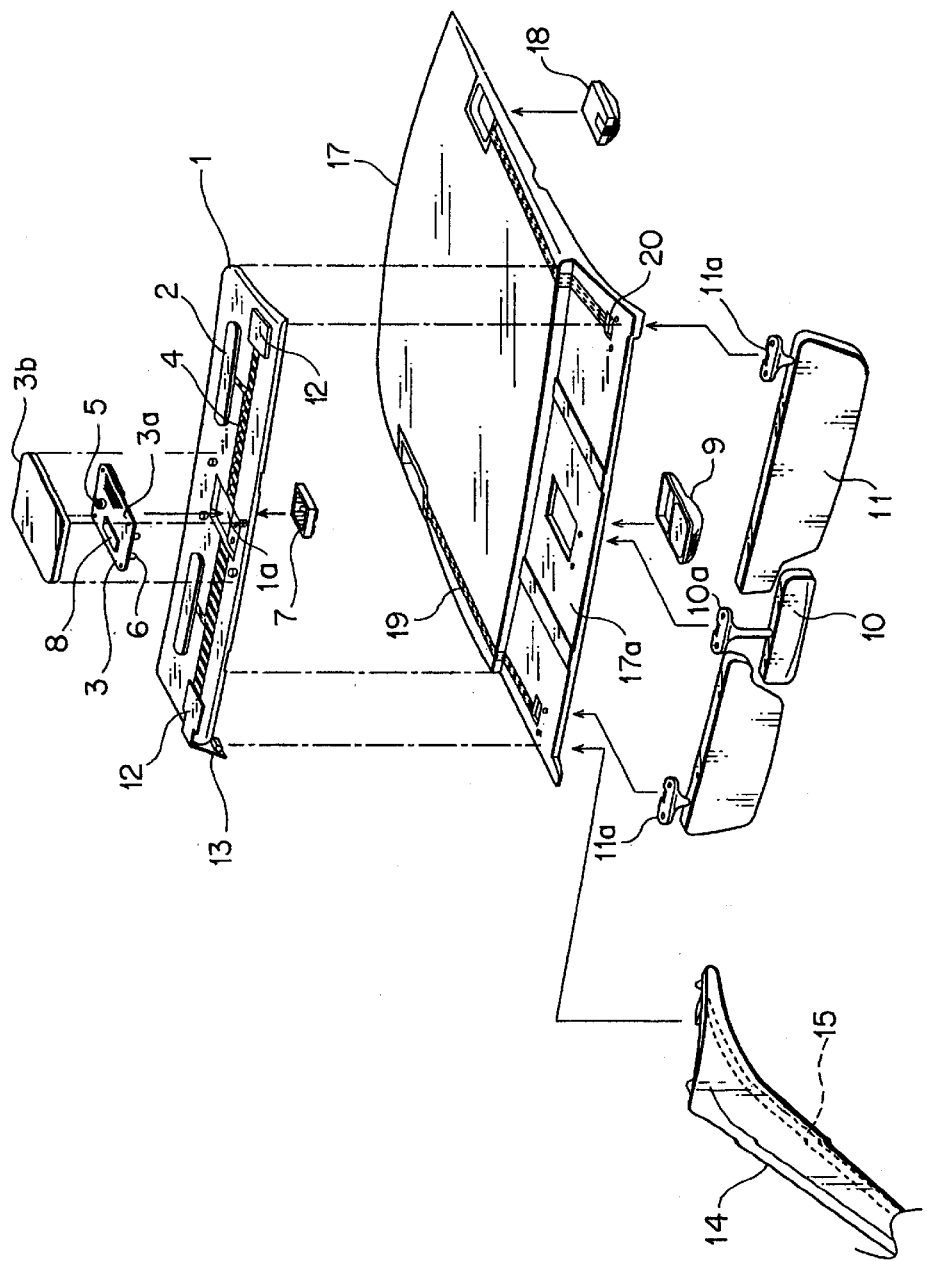
FIG. 14 is a separated perspective view of a known roof module.

And, the television 37 is fixed on the roof by way of the bracket 36", FIG. 2, ahead of the roof air-conditioning unit D. Then, the molded ceiling panel 21, FIG. 13, is fitted on the vehicle roof R to cover the unit D and the television 37.

Figure 11:
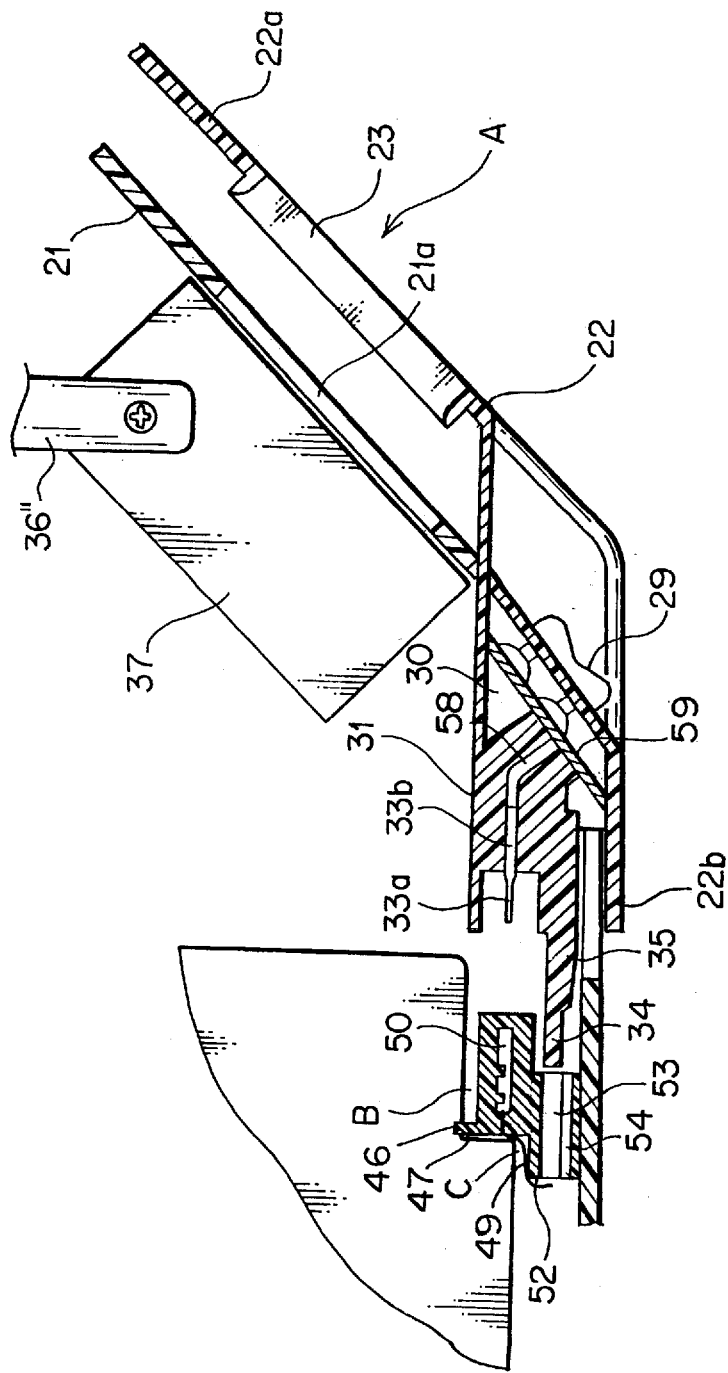
FIG. 11 is a basic sectional view of the electrical equipment module A and a preliminarily oriented connector C shown in FIG. 1, which are in a state before engagement.

Next, as shown in FIG. 11, the bezel 22 of the electrical equipment module A is aligned so as to oppose to the aperture 21a of the molded ceiling panel 21. That is, the supporting plate 22b of the bezel slidably makes contact with a bottom face of the molded ceiling panel 21. This allows the engagement hole 54 of the module receiving portion 52 of the connector C to align with the positioning projection 35 of the female connector 31. Then, the electrical equipment module A is forced into the molded ceiling panel 21.

The engaging force inserts the guide projection 34 into the engagement hole 53 of the module receiving portion 52, in which a wiring harness W and installation of the electrical equipment module A into the roof air-conditioning unit D where the connector receiving portion B receives the preliminarily oriented connector C.

At first, as shown in FIG. 2, the roof air-conditioning unit D is secured on the vehicle roof R by way of the brackets 36, 36'. Then, the roof wiring harness W, as shown in FIGS. 7 and 8, is disposed by using the wire hooks 42 formed on the unit case 38. The terminal connector $43_1$ of the branch line W1 is engaged to connect to the integrated connector 41 of the air-conditioning unit. In the connector receiving portion B of the unit case 38, the flange 51 of the preliminarily oriented connector C is forced upwardly into the flange positioning groove 46, FIG. 11. Then, screws (not shown) fix the preliminarily oriented connector C, FIG. 7, to the unit case 38.

And, the television 37 is fixed on the roof by way of the bracket 36", FIG. 2, ahead of the roof air-conditioning unit D. Then, the molded ceiling panel 21, FIG. 13, is fitted on the vehicle roof R to cover the unit D and the television 37.

Next, as shown in FIG. 11, the bezel 22 of the electrical equipment module A is aligned so as to oppose to the aperture 21a of the molded ceiling panel 21. That is, the supporting plate 22b of the bezel slidably makes contact with a bottom face of the molded ceiling panel 21. This allows the engagement hole 54 of the module receiving portion 52 of the connector C to align with the positioning projection 35 of the female connector 31. Then, the electrical equipment module A is forced into the molded ceiling panel 21.

The engaging force inserts the guide projection 34 into the engagement hole 53 of the module receiving portion 52, in which a tapered portion 34a of the projection 34 and the insertion guiding face 53a allow their smooth sliding engagement. Then, the positioning projection 35 having a tapered-down tip advances into the engagement hole 54 with the insertion guiding face 54a. Accordingly, the electrical equipment module A is aligned with and smoothly guided into the module receiving portion 52.

Figure 12:
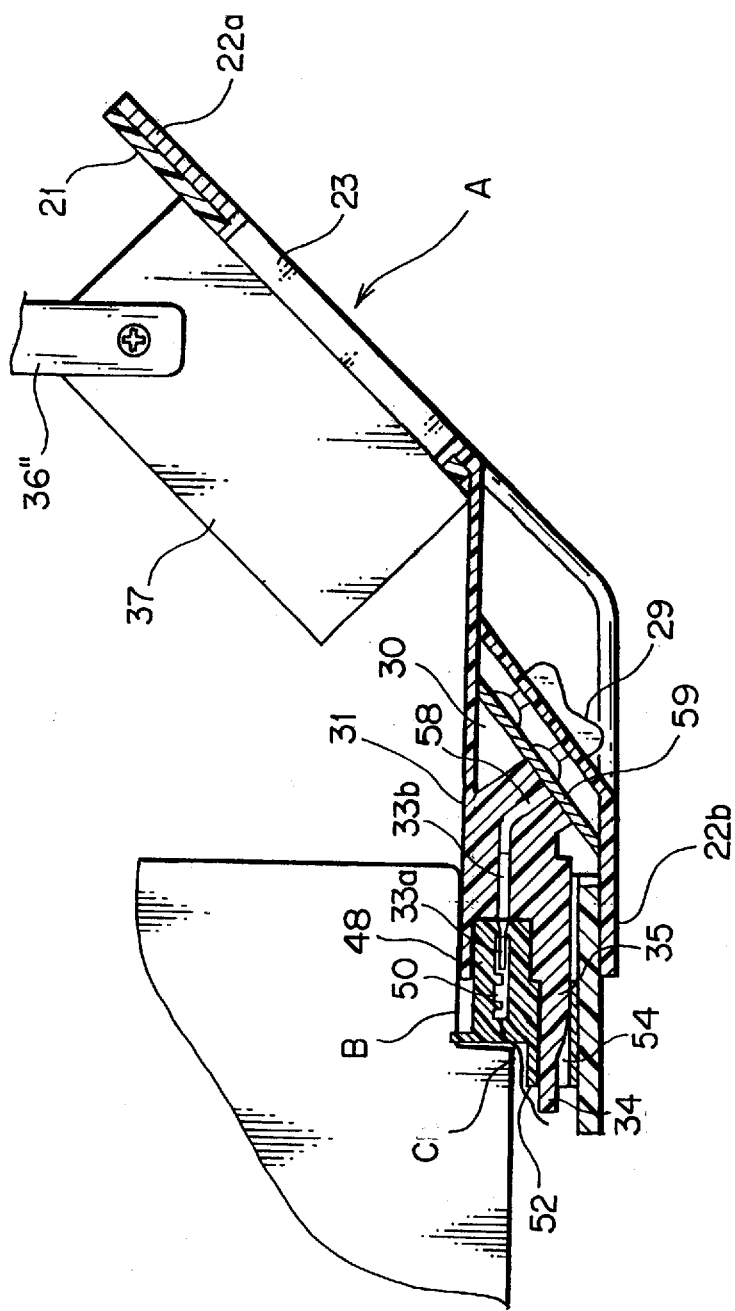
FIG. 12 is a basic sectional view of an engaged state relating to FIG. 11.

Finally, as shown in FIG. 12, the connector case 48 of the preliminarily oriented connector C engages with the hood 32a of the female connector 31. The male terminal 33b is received in the female terminal 50, accomplishing electrical connection between the connector C and the connector 31. At the same time, the lock projections 27 (shown in FIG. 3) of the bezel 22 locks to an opening periphery of the aperture 21a, FIG. 13, in the molded ceiling panel 21.

Accordingly, the roof wiring harness W, FIG. 1, can be easily disposed and secured by using the unit case 38 of the roof air-conditioning unit D. Further, the connector receiving portion B provided in the unit case 38 can easily secure the preliminarily oriented connector C provided at one end of the harness. Furthermore, the module receiving portion 52 of the female connector 31 has the guide projection 53 and the positioning projection 54, which allowing mechanical and electrical connection of the electrical equipment module A at a time.

Figure 15B:
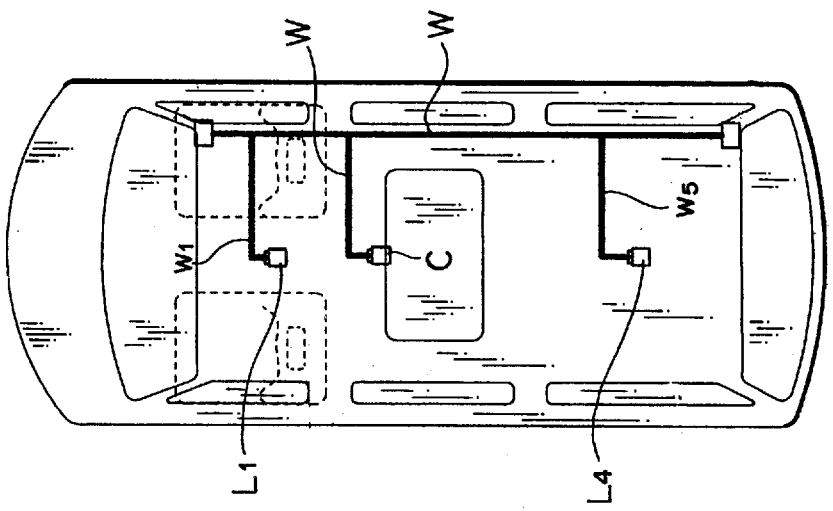
FIG. 15B is an electrical wiring diagram of a roof wiring harness according to the invention.
Figure 15A:
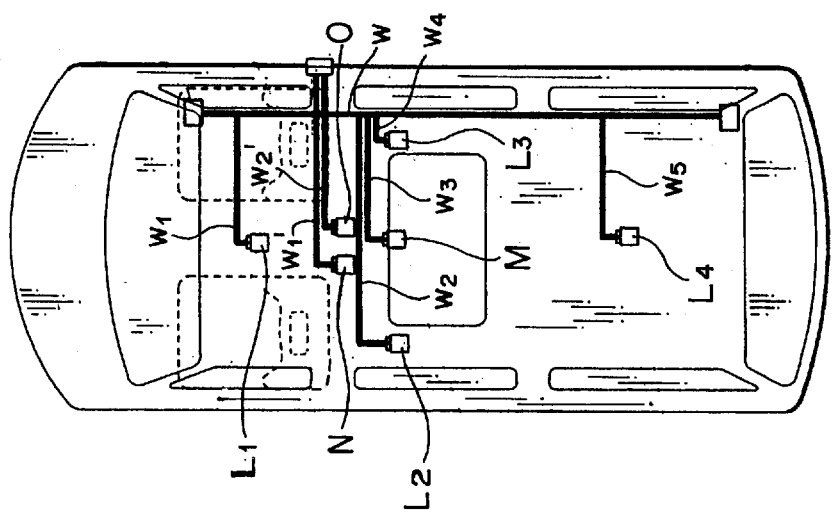
FIG. 15A is an electrical wiring diagram of a known roof wiring harness.

FIG. 15B shows an electrical wiring arrangement of a roof wiring harness W, where a roof air conditioning assembly according to the present invention is applied. The wiring arrangement in FIG. 15B is shown definitely in comparison with FIG. 15A. In FIG. 15B, the roof wiring harness W and branch lines W1, W5 for a map lamp L1 and the rear the room lamp L4 remain. But, left and right spot lamps L2, L3 are replaced by the spot lamp 55 provided in the bezel 22. This omits branch lines W2, W4. Further, the roof wiring harness W includes branch lines W1', W2' for the sun roof M and the rear room lamp L4. Accordingly, this achieves a simplified electrical wiring arrangement, enabling a greatly simplified wiring work.

In the aforementioned embodiment, the bezel 22, FIG. 2, has the control nit 30, which controls the spot lamp 55 and the air conditioning switch 29, the sun roof switch 29', etc., and the bezel 22 also has a switch panel (not shown) unitedly. The control unit 30, FIG. 1, may be provided in the unit case 38 of the roof air-conditioning unit D or in another place. These arrangements may be selected in consideration of the bezel 22 and the unit case 38 in size and construction together with arrangement of other equipment. FIG. 13 shows the alternative arrangement described above.

In a roof air conditioning assembly E' shown in FIG. 13, which includes an electrical equipment module A', a bezel 22', a control unit 30' and a switch panel 60 are preliminary completed separately. The control unit 30' also includes the printed wiring board 59 and has unitedly the female connector 31 (see FIG. 11).

Meanwhile, a unit case 38' of a roof air-conditioning unit D', FIG. 13, has unitedly, between each side duct 39, a television mounting upper portion 61 and a control unit mounting lower portion 62. In each side of the television mounting portion 61 there is formed a lamp mounting aperture 25'. The television mounting portion 61 has a television connector 63 therein. The control unit mounting portion 62 includes a connector 63 therein. The control unit mounting portion 62 includes a connector (not shown) for the control unit 30'.

Furthermore, the assembly E', FIG. 13, does not have the integrated connector 41 provided on the top wall 38b of the unit case 38 shown in FIG. 7 and also does not have the connector receiving portion B formed in a central bottom surface. Alternatively, the assembly E', FIG. 13, has unitedly another integrated connector 41' in the middle lower part of the unit case 38'. The integrated connector 41' includes connector terminals (now shown) for connecting electrical equipment such as the blower motor in the roof air-conditioning unit and for connection of the control unit 30'. And, the integrated connector 41' can connect directly to a connector C' provided at one end of a roof wiring harness W'.

The roof air conditioning assembly E' shown in FIG. 13 is using the structure of the unit case 38' of the roof air-conditioning unit D'. That is, the television mounting portion 61, the control unit mounting portion 62, and the lamp mounting aperture 25', are unitedly formed adjacent to the ducts 39, 39. This arrangement can omit supporting members such as the bracket 36" shown in FIG. 2, enabling a more compact arrangement as a whole.

Furthermore, the roof air-conditioning unit D' and the unit case 38' may be preliminarily mounted with the television 37 and the control unit 30' respectively in the television mounting portion 61 and the control unit mounting portion 62. This unit, consisting of one body, not only has advantages in assembling, production, storage, and transportation, but also provides a simplified work for fitting to a vehicle body. Even where the television 37 and the control unit 30' are installed in a later assembling process, the installation into the mounting portions 61, 62 accomplishes simultaneously electrical connection thereof by the connector 63 or the like.

Moreover, in the roof air conditioning assembly E', the integrated connector 41' engages with the connector C' of the roof wiring harness W'. This engagement accomplishes almost all of electrical connections for the electrical equipment module A', the roof air-conditioning unit D', the television 37, etc., enabling a great improvement in the assembling work.

What is claimed is:

1. A roof-mounted air conditioner assembly comprising:

an air-conditioning unit installed on a vehicle roof and having a duct, a molded ceiling panel having an aperture opened to said duct of said air-conditioning unit, a bezel fitted into said aperture of said ceiling panel and mounted with at least one of a switch, a lamp, and an instrument, an electrical equipment module having a connector for electrically connecting said at least one of a switch, a lamp and an instrument, and a roof wiring harness having a connector secured thereto, wherein said roofing air-conditioning unit has a connector receiving portion provided in the side of said duct for receiving said connector of said roof wiring harness; and said electrical equipment module is attached to said roof air-conditioning unit through said aperture of said molded ceiling panel so that said connector of said electrical equipment module connects with said connector of said roof wiring harness.

2. A roof-mounted air-conditioning assembly as claimed in claim 1, wherein said roof-conditioning unit has a unit case, a peripheral wall of which is fitted with a plurality of wire hooks for holding said roof wiring harness.

3. A roof-mounted air-conditioning assembly as claimed in claim 1, wherein said connector has a connector case having a module receiving portion; and the connector of said electrical equipment module has a guide member that engages with said module receiving portion, allowing said electrical equipment module to be assembled in said roof air-conditioning unit.

4. A roof mounted air-conditioning assembly as claimed in claim 1, wherein said bezel has a connector for electrical connecting said at least one of said switch, said lamp, and said instrument, and has a control unit for said switch, said lamp, and said instrument.

5. A roof-mounted air-conditioning assembly as claimed in claim 1, wherein a control unit for controlling said switch, said lamp, and said instrument is provided in said air-conditioning unit.

6. A roof-mounted air-conditioning assembly comprising:

a roof air-conditioning unit installed on a vehicle roof, a molded ceiling panel having an aperture opened to a duct of said air-conditioning unit, a bezel fitted into said aperture of said ceiling panel and mounted with at least one of a switch, a lamp, and an instrument, a control unit for controlling said at least one of said switch, said lamp, and said instrument, wiring harness on said roof and having a connector, wherein said roof air-conditioning unit has a control unit mounting portion provided in the side of the duct, and has an integrated connector for connecting said control unit and for connecting an electrical equipment, such as a blower motor provided in said roof air-conditioning unit; said control unit can be attached to said control unit mounting portion; and said integrated connector can connect to the connector of said roof wiring harness, allowing said roof wiring harness, said control unit, and said roof air-conditioning unit to make electrical connection with each other.

* * * * *